H. B. PALMER.
GAME APPARATUS.
APPLICATION FILED AUG. 31, 1912.

1,093,577.

Patented Apr. 14, 1914.

WITNESSES:
R. M. Mowry
L. D. Pierson

INVENTOR,
Harry B. Palmer,
BY
Chapin &Co.
ATTORNEY.

COLUMBIA PLANOGRAPH CO., WASHINGTON, D. C.

UNITED STATES PATENT OFFICE.

HARRY B. PALMER, OF NEW YORK, N. Y., ASSIGNOR TO MILTON BRADLEY COMPANY, OF SPRINGFIELD, MASSACHUSETTS, A CORPORATION.

GAME APPARATUS.

1,093,577.   Specification of Letters Patent.   Patented Apr. 14, 1914.

Application filed August 31, 1912.   Serial No. 718,121.

*To all whom it may concern:*

Be it known that I, HARRY B. PALMER, a citizen of the United States of America, residing at New York, in the county of New York and State of New York, have invented new and useful Improvements in Game Apparatus, of which the following is a specification.

This invention relates to improvements in game apparatus of the kind in which two charts are employed to play the game, one of the charts being supplied with questions and the other with answers, and a suitable indicating device adapted to be transferred from the question chart to the other in playing the game, which indicating device is adapted to be rotated to any desired question on the question chart and when transferred to the second chart will correctly point or indicate the desired answer.

The invention in general comprises a representation of a suitable figure that can be rotated relative to the chart containing the questions. When this figure to which a permanent magnet is attached is transferred to the chart whereon the answers are located the permanent magnet that is secured to the answer chart will cause the figure to rotate and the two magnets will be alined with each other in planes that are parallel with each other, whereby this rotation of the figure will automatically point to the desired answer. The game being known as the "Salem witch" game on account of the unseen forces which cause the figure to turn on the answer chart about a vertical axis. The invention therefore utilizes the principle in magnetism that like poles repel and unlike attract, and that the two magnets will automatically position themselves in parallel relation so that the greatest number of lines of force will practically all lie in the fields of the two magnets.

Figure 1:
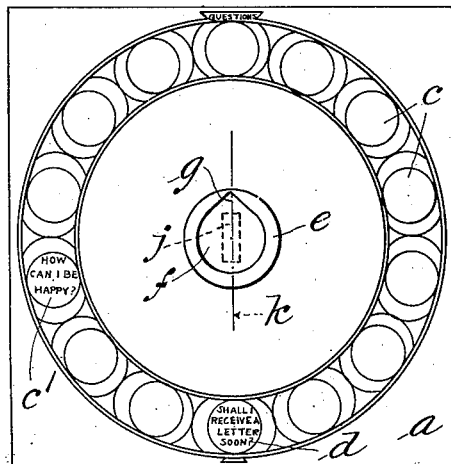
Figure 2:
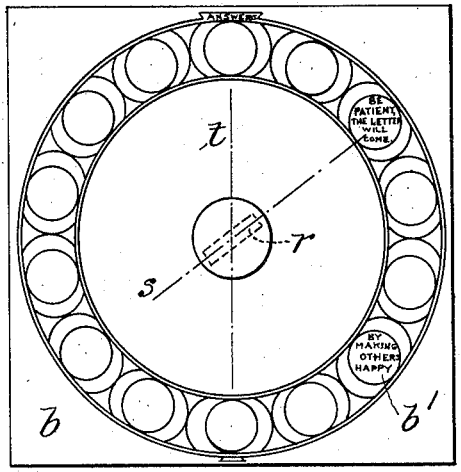
Figure 3:
Figure 4:
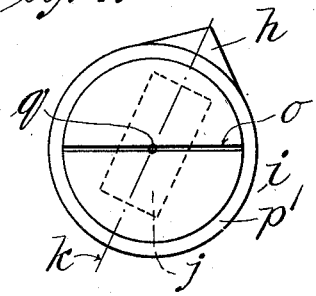

Referring to the drawings,—Figure 1 indicates the question chart. Fig. 2 indicates the answer chart. Fig. 3 is a detailed view, partly in section, showing the construction of the base portion of the transferable member and the permanent magnet located therein and to this base portion the figure is secured, that is designed to point to the questions and answers. Fig. 4 is a plan view of the base portion with the figure removed that is designed to be transferred from one chart to the other in selecting the questions and in obtaining the answers thereto. The figure is temporarily removable from the diametrical groove shown in the upper surface.

Referring to the drawings in detail $a$ designates the question chart and $b$ the answer chart.

$c$ designates a series of rings on the question chart and on these rings are placed the questions as indicated at $d$ which contains the inscription for instance "Shall I receive a letter soon?" similar inscriptions being placed on the other series of circles of the question chart, as "How can I be happy?" as shown at $c^1$. Located in the center of the chart is a raised annular portion $e$ the interior of which forms a recess portion $f$, the recess portion having a pointed end part $g$ adapted to receive the correspondingly shaped part $h$ of the transferable base member $i$ which is shown in section in Fig. 3 and in plan in Fig. 4. In the lower part of this base member is located a permanent magnet $j$ that is fixedly secured in the position indicated in Fig. 4, that is with the axis $k$ of the magnet passing through the pointed end $h$ of base member $i$. Attached to the rotatable upper part of this base member is the figure shown in Fig. 3 representing the witch having a wand or pointer $n$ in her hand. This witch figure is temporarily secured in the diametrically arranged slot $o$ of the upper member $p$, which member is rotatable on the lower part $p^1$. The connecting pin $q$ turns with the upper member $p$ and is loosely mounted in the lower part $p^1$. Rigidly secured in the center and base part of the answer chart $b$ is the permanent magnet $r$ as clearly shown in Fig. 2, the axis $s$ of this magnet being arranged at an angle to the line $t$ as shown. The rotatable upper member $p$ rests on an interposed piece of paper or other material $p^2$ to provide a sufficient amount of friction between the upper and lower members $p$ and $p^1$ and this paper is for the purpose of temporarily retaining the witch figure in place on the lower part $p^1$ during the transfer from the question chart to the answer chart and during the time the entire base member $i$ is rotated by the magnet $j$ so that the two axes $k$ and $s$ are in alinement. Or, in other words, during the time the base member $i$ is being rotated by reason of the attractive force between the two magnets which results in causing the two axes $s$ and $k$ to lie in the same vertical plane.

The game is played as follows: The lower portion $p^1$ shown in Fig. 3 is inserted in the recess $f$ of the question chart with the angular part $h$ entering the angular-shaped end $g$. In this position, the axis of the permanent magnet $j$ passes through the angular part $g$ of the ring $e$, as shown in Fig. 1. The player then turns the pointer or wand $n$ of the witch figure to any desired question, as, for instance, at the bottom of the question chart $a$, indicated at $d$ "Shall I receive a letter soon?" This operation rotates the upper part $p$ on the lower part $p^1$. The witch figure and the entire base piece $i$ are then together transferred to the answer chart and placed in any position over the magnet $r$. The piece of paper $p^2$ meanwhile serves to retain the upper and lower parts $p$ and $p^1$ in position. The two magnets $j$ and $r$ will automatically aline themselves so that the north and south poles of the permanent magnet $j$ will be exactly over the south and north poles of the permanent magnet $r$ causing the pointer $n$ to turn to the correct answer, as indicated by the words "Be patient the letter will come". The two axes $k$ and $s$ are then in parallel relation. When the member $i$ is placed on the answer chart $b$ its lowermost surface will revolve on the answer chart causing the witch figure and the upper and lower members $p$ and $p^1$ to revolve together or until the axes of both magnets are in the same vertical plane.

The lower surface of the base-piece $i$ is preferably made of some substance having a smooth surface, as tin, or brass, and is made slightly curving in order to reduce the friction between the base-piece and the answer-chart, whereby the attractive forces between the two magnets $j$ and $r$ will cause the figure to rotate on this curved surface without the use of any kind of a pivot construction.

The design or theory of the game is that the axis $k$ of the permanent magnet $j$ and the point $g$ will always assume the same position on the answer chart, that is, the angular relation between the direction of the wand or pointer $n$ with the line passing through the point $g$ will be the same as the direction of the pointer with the line passing through the magnet $r$. The rotation of the witch figure shown in Fig. 3 by the operator and which causes the part $p$ to revolve on $p^1$ does not in any way change the position of the magnet $j$, and no matter in what position the pointer comes to rest on the chart $b$ the two magnets always lie in the same direction as by way of another example, suppose the pointer $n$ of the figure is directed to the question "How can I be happy?" indicated at $c^1$ the corresponding answer is shown on the answer chart at $b^1$ which is "By making others happy" and it will be noticed that the angular relation of the two questions in Fig. 1 is the same as the angular relation of the two answers on the answer chart in Fig. 2, and so on entirely around the circle, that is to say, if pointer $n$ is moved one step farther toward the left on the question chart the pointer will indicate the correct answer and will be one step farther toward the left on the answer chart.

What I claim, is:—

1. In a game apparatus, the combination, two charts each being formed with a series of regularly spaced divisions, one being designated the question chart and the other the answer chart, a pointer device, a base member, the upper part of which is rotatable relative to the lower part, the pointer device being secured to the upper part for positioning said device with relation to the lower part, means mounted in the base member, and means in the answer chart to cause the base member to always assume the same position when the base member and its pointer device are transferred from the question chart to the answer chart.

2. A game apparatus comprising two chart members, one being provided with questions and the other with answers, a pointer device adapted to be transferred from the question chart to the answer chart member, and means to cause the pointer device to automatically assume a predetermined position on the answer chart.

3. A game of the class described comprising two chart members, one being provided with questions and the other with answers, a pointer device for transfer from one chart to the other to indicate the questions and answers, means to permit the pointer device to be rotated to any desired question on the question chart member, and means to cause the pointer device to assume a predetermined position when transferred from the question chart to the answer chart to indicate the answer as described.

4. A game apparatus of the kind described comprising two chart members, a pointer device rotatably mounted on a base member and adapted to be transferred from one chart to the other, means to retain the base member in a fixed position on one of the chart members, means to cause the base member and the pointer member to assume a definite position on one chart member when transferred from the first chart member to the second chart member.

5. In a game apparatus, the combination, two chart members formed with equally spaced divisions, one being designated a question and the other an answer chart, a two-part base member rotatably connected together for transfer from one chart member to the other, a pointer secured to the upper part of the base member to designate any question on the question chart, means in the base member, and means in the answer chart to cause the base member to assume a definite position when the base member is transferred to the answer chart, whereby the pointer will pick out the answer intended, as described.

6. A game apparatus comprising two chart members having regularly divided circles thereon, one circle having questions and the other answers thereon, a two part base-member rotatably connected together for transfer from one chart member to the other, a friction element to temporarily retain the members of the base from relative movement, means on the question chart to retain the lower part of the base member from movement when the upper part of said member is rotated, a pointer secured to said upper part to indicate questions and answers, means to cause the base member to assume a definite position when on the answer chart when transferred thereto, whereby the pointer will automatically select the answer intended to correspond with the question selected.

HARRY B. PALMER.

Witnesses:
GARDINER MERRITT,
TARRAND D. BROWER.

Copies of this patent may be obtained for five cents each, by addressing the "Commissioner of Patents, Washington, D. C."